US012028674B2

(12) United States Patent
Madsen et al.

(10) Patent No.: US 12,028,674 B2
(45) Date of Patent: Jul. 2, 2024

(54) ON-EAR HEADPHONES WITH STAGGERED PERFORATIONS

(71) Applicant: GN Audio A/S, Ballerup (DK)

(72) Inventors: Jon Grane Madsen, Ballerup (DK); Jack Zhao, Ballerup (DK); Bill Zeng, Ballerup (DK); Frank Zhang, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 205 days.

(21) Appl. No.: 17/818,694

(22) Filed: Aug. 9, 2022

(65) Prior Publication Data

US 2023/0053043 A1 Feb. 16, 2023

(30) Foreign Application Priority Data

Aug. 13, 2021 (CN) ........................ 202110929882.X

(51) Int. Cl.
*H04R 1/10* (2006.01)

(52) U.S. Cl.
CPC ........... *H04R 1/105* (2013.01); *H04R 1/1008* (2013.01)

(58) Field of Classification Search
CPC .. H04R 1/1058; H04R 1/1066; H04R 1/1091; H04R 1/1008; H04R 2201/10
USPC .......................................................... 381/374
See application file for complete search history.

(56) References Cited

U.S. PATENT DOCUMENTS

| | | | | |
|---|---|---|---|---|
| 4,058,688 A | 11/1977 | Nishimura et al. | |
| 10,469,939 B1 | 11/2019 | Tikander et al. | |
| 2013/0022225 A1* | 1/2013 | Chiang | H04R 1/1075 381/371 |
| 2018/0367885 A1* | 12/2018 | Gong | H04R 9/025 |
| 2022/0070565 A1* | 3/2022 | Degraye | H04R 1/028 |
| 2022/0210533 A1* | 6/2022 | Lin | H04R 1/105 |

FOREIGN PATENT DOCUMENTS

EP 202013104088 U1 1/2014

OTHER PUBLICATIONS

The extended European search report issued in European Application No. 22189976.8, dated Dec. 22, 2022.

* cited by examiner

*Primary Examiner* — Sean H Nguyen
(74) *Attorney, Agent, or Firm* — HSML P.C.

(57) ABSTRACT

The disclosure relates to on-ear headphones comprising at least one ear-cushion, the at least one ear-cushion defining an ear-surface configured to interface with a user's ear when the headphones are worn by the user, the ear-surface comprising a perforated area, the perforated area comprising a plurality of staggered elongated perforations.

11 Claims, 7 Drawing Sheets

ON-EAR HEADPHONES WITH STAGGERED PERFORATIONS

TECHNICAL FIELD

The present disclosure relates to on-ear headphones. More specifically, the disclosure relates to on-ear headphones as defined in the introductory parts of claim 1.

BACKGROUND ART

Headphones are a pair of ear-cushions having speaker drivers worn on or around the head over a user's ears. They convert an electrical signal to a corresponding sound. Headphones allow a single user to listen to an audio source privately, in contrast to a loudspeaker, which emits sound into the open air for anyone nearby to hear. Headphones are also known as earspeakers, earphones or headset. Circumaural, i.e. "over-ear", and supra-aural, i.e. "on-ear", headsets normally use a band over the top of the head to hold the speakers in place. Another type, known as earbuds comprise individual units that fit into the user's outer ear or ear canal. During a longer use, all headsets create discomfort on the user's ears and therefore it is important to design the headset to be comfortable for the user.

With on-ear headsets in which the ear-cushions are flat and abut the user's ears, the cushions press against the user's ear and a build-up of discomfort occurs during prolonged use. One of the problems with known on-ear headsets is that pressure is especially prominent in the center of the ear, i.e. on the tragus and anti-tragus. There is thus a need for an improved on-ear headset which provides a good comfort for the user.

SUMMARY OF THE INVENTION

It is an object of the present disclosure to mitigate, alleviate or eliminate the above-identified deficiency and disadvantage in the prior art and solve at least the above mentioned problem.

It is an object of the embodiments of the present invention to provide a comfortable on-ear headset.

It is a further object of the embodiments of the present invention to provide a headset with a soft and stretchable layer that abuts the user's ear.

It is a yet further object of the present invention to provide an on-ear headset which creates a decreased pressure on the user's ear compared to known headsets.

It is a further object of the embodiments of the present invention to provide a headset with a long-term comfort.

According to a first aspect there is provided on-ear headphones comprising at least one ear-cushion. The at least one ear-cushion is defining an ear-surface. The ear-surface is configured to interface with a user's ear when the headphones are worn by the user. The ear-surface is comprising a perforated area. The perforated area is comprising a plurality of staggered elongated perforations.

In the present context, the term on-ear headphones is used to refer to headphones with one or two ear-pads that press against the ear, rather than around the ear of the user. The on-ear headphones, i.e. its pads, are configured to rest on the ear. These typically do not completely enclose or envelope the ear. This type of headphones is sometimes referred to as supra-aural headphones.

An alternative solution for the on-ear headphones are circumaural headphones with a donut-shaped ear-cushions. However, this type of earcups have various disadvantages in terms of acoustic sealing and also in terms of production control and size fit. The on-ear headphones tend to be smaller and lighter than the circumaural. In the present application, the main focus is on the on-ear headphones. The term headphones may interchangeably be used with the term headset. The headset may comprise at least one microphone. The headset may comprise an antenna for connection with an audio signal source, such as a radio, a mobile phone, a laptop, video game console, electronic music instrument, an amplifier, or similar.

The headphones with one ear-cushion are typically referred to as a mono-headset. The other end of the mono-headset typically has a support, which is sometimes referred to as a T-bar. The headset may alternatively have two ear-cushions interconnected with a band. The band may be configured to rest at the top of the user's head. The headphones with the two ear-cushions are typically referred to as a duo-headset or stereo-headset. Typically both ear-cushions are same in size and may have different pattern of the perforations to indicate which ear-cushion is to be worn on the left and which one on the right user's ear. These indicators may be embedded inside the pattern.

In the present context, the ear-cushion is to be interpreted as a unit comprising at least one speaker providing sound to the user. The ear-cushion typically has a round shape. The ear-cushion may comprise a plurality of electronic components. These components may be responsible for signal processing and general functioning of the headset. The speaker and electronic components may be placed in a housing. The housing may be made of a hard and rigid plastics providing a general shape of the ear-cushion. The housing may be an inner ear-cushion. The housing may then be enveloped with one or more layers of soft material to ensure a good comfort for the user. The soft cushioning may form an outer ear-cushion. The cushion may press against the user's ear to thereby enable acoustic sealing and secure fit of the headset on the user's head during use. To ensure a good acoustic sealing and secure fit of the headset during use, the cushion surface interfacing with the ear is typically a flat continuous surface. This surface is typically made from PU leatherette, ensuring good feeling on the ear. The ear-cushion may be removably attached to an over-the-head band. Also, the ear-surface may be removably attached to the housing with electronics of the ear-cushion.

The ear-surface is a surface configured to be in a direct contact with the user's ear as well as to directly abut the ear. The ear-surface may be a top layer of the outer portion of the ear-cushion, in case the outer ear-cushion comprises more than one layer. The ear-surface is configured to interface with a user's ear when the headphones are worn by the user. The ear-surface may be flat and continuous with a plurality of perforations.

The perforated area is typically the central part of the ear-surface formed by a number of perforations organized in well-defined adjacent patterns. The perforated area may be positioned on the ear-surface to directly overlap the ear canal and abut with the tragus and antitragus. In general, the patterns of the perforated area can be of any shape, e.g. a circular shape, a rectangular shape, a squared shape, pentagon, hexagon, octagon, oval, a straight line, etc.

The perforated area is comprising perforations and non-perforated areas formed between adjacent and/or neighbouring perforations. The main purpose of the perforations is to let sound pass through the ear-surface and thereby enable and improve listening experience. The perforations may be created in the top layer of the outer portion of the ear-cushion in case the outer ear-cushion comprises more than one layer and if the layers below the top layer can let the sound pass through. Alternatively, the perforations may extend through the outer ear-cushion all the way to the housing to allow the sound from the speaker to reach the user's ear.

The plurality of perforations in adjacent patterns are staggered. In other words, neighbouring perforations of adjacent patterns are arranged in any of various zigzags, alternations, or overlapping configuration. Namely, the perforations in adjacent patterns are alternated with areas without perforations. The perforations may all have the same shape and size.

In the present context, the term staggered may be interpreted as an arrangement in which the leading edge of one perforation is advanced over a neighbouring perforation in the adjacent pattern.

In the present context, the term elongated may be interpreted such that a perforation width is smaller than a perforation length. Namely, an elongated perforation is long in relation to its width.

The width of the perforations may be determined by the material used for the ear-surface, its type and/or thickness. The minimum width of a perforation may be around 0.5 mm.

By forming elongated perforations in a staggered formation in the ear-surface, the ear-surface has an increased softness and stretchability resulting in an improved flexibility of the ear-surface and thereby better comfort for the user, compared to known headsets. Such ear-surface creates a decreased pressure on the user's ear and enables a prolonged use of the headset without causing any discomfort. Namely, by having a soft and flexible ear-surface pressure points on the prominent ear parts are avoided.

According to some embodiments, at least two elongated perforations have different size. At least two elongated perforations in the same pattern may have different size. Also, at least two perforations in the adjacent patterns may be different in size. The size difference may be a difference in a perforation length and/or difference in perforation width. Having perforations with a different length and/or width increases stretchability of the perforated area and thereby the flexibility of the entire ear-surface.

According to some embodiments, the plurality of perforations are arranged in concentric circles. At least two perforations from two neighbouring circles may be in a staggered formation. In this embodiment, the perforated area is a circle, typically having its center in the center of the ear-cushion. The perforated area may comprise at least three concentric circles. The first, smallest concentric circle, may comprise three or more elongated perforations of the same or different size. The next concentric circle may comprise at least one more perforation compared to the first circle. A space between two perforations in the same circle will be referred as a bridge. A bridge in one circle is typically formed beside a perforation of an adjacent circle. In this manner, perforations of adjacent circles are in the staggered formation. Also, when bridges are formed next to perforations on both sides, a maze is formed starting from the center of the perforated area and towards the outer borders of this area. Namely, it is not possible to draw a straight line along the bridges, i.e. between the perforations, from the center of the perforated area to the outer borders, without crossing at least one perforation. This means that it is possible to achieve a longer distance or path from the outside of the perforated area to its center, or to a point of contact with the ear geometry (e.g. tragus and/or antitragus) when passing across neighbouring bridges. Achieving longer distances means that the material is more flexible and therefore the contact points with the ear are exposed to less pressure. Such perforation formations improves flexibility, stretchability, and softness of the ear-surface and thereby provides improved comfort to the headset user. Instead of the concentric circles, the perforations may be arranged in any other concentric patterns, e.g., concentric polygons (squares, pentagon, hexagons, etc.), concentric ellipses, concentric stars, etc. The same principles, formations, and advantages equally apply for such patterns.

According to some embodiments, the plurality of perforations are arranged in parallel straight lines. At least two perforations from two neighbouring lines are in a staggered formation. In this embodiment, the perforated area may take any shape as the parallel lines may have different length. It may take a quadrilateral shape, such as a trapezoid, square, rectangle, or rhombus, typically having its center in the center of the ear-cushion. The perforated area may comprise at least three parallel line patterns arranged side by side. The line patterns may have different lengths compared to each other. Two adjacent perforation line patterns are typically separated by a distance approximately equal to the width of perforations. A space between two perforations in the same line pattern will be referred as a bridge. A bridge in one line pattern is typically formed beside a perforation of an adjacent line pattern. In this manner, perforations of adjacent line patterns are in the staggered formation. Namely, the leading edge of one perforation in one line pattern is advanced over a neighbouring perforation in the adjacent line pattern. Thus, when bridges are closed with perforations on both sides, a labyrinth is formed starting from one side of the perforated area and towards the opposite side of this area. Namely, it is not possible to draw a straight line along the bridges, i.e. between the perforations, starting from one side of the perforated area and to the opposite side of this area, without crossing at least one perforation. Such perforation formations improves flexibility, stretchability, and softness of the ear-surface and thereby provides improved comfort to the headset user. In particular, the softness and flexibility of the perforated area is improved, and thereby comfort for the user.

According to some embodiments, the perforated area occupies at least 3% and at most 50% of the entire ear-surface. Typically, the perforated area occupies the area of the ear-surface overlapping with the tragus, antitragus, and the ear canal. In order to provide good sound properties, i.e. allow sound to exit the ear-cushion, and also improve elasticity of the ear-surface, the perforated area may occupy minimum 3% of the central part of the ear-surface. In order to preserve rigidity and durability of the ear-surface, the perforated area may occupy up to 50% of the ear-surface. The perforated area may occupy minimum 40%, such as 30%, such as 20%, such as 10%. The perforated are may occupy up to 45%. Also, to large perforation area may cause undesired sounds, e.g. noise, entering the user's ear. In general, the size of the perforated area may be defined by the application of the on-ear headphones, i.e. by intended use, by a required sound performance, and/or by a required acoustic sealing level.

According to some embodiments, the ear-cushion comprise at least one layer being made of a foam material. The foam material improves softness of the ear-cushion and thereby the user's comfort when using the headset. The foam layer may comprise a dual-layer foam. The foam may allow sound from the speaker to reach the user's ear. Alternatively, the foam material may define a hole below the perforated area. Namely, there may be no foam between the housing with the speaker and other electronics for signal processing and the ear-surface.

According to some embodiments, the ear-surface is made of a plastic material, such as polyurethane, and/or leatherette material. Alternatively, any other material providing acceptable durability may be used for the ear-surface. For instance, various fabrics, films, leather, etc. with formed elongated staggered perforations may be used. A mesh made of, e.g., fabric may be arranged below the ear-surface with perforations.

According to some embodiments, the perforations are at least 1 mm long. According to some embodiments, a width-to-length ratio of the perforations is at least 1:2, resulting in elongated perforations. Elongated perforations add to the elasticity of the ear-surface, thereby allowing this surface to deform easily in different directions. When the ear, e.g. the tragus, press against the ear-cushion, the surface which can deform and stretch more compared to, e.g. a surface with non-elongated round holes.

According to some embodiments, the ear-surface is substantially flat. The flat surface, in general, results in a more comfortable headphones as it rests on the outer ear, and allow the user to have a fair idea of sound sources in the environment.

According to some embodiments, the plurality of perforations are arranged such to form a maze when starting from the center of the perforated area and towards an outer border of the perforated area. Namely, by interconnecting bridges (formed between two neighbouring perforations within the same pattern) of adjacent patterns a curved inter-bridges line is created. The perforations are formed by cutting the material of the ear surface perpendicular to the material's stretching direction, thus making the maze longer, leading to the ear-surface to be more soft and stretchable. Since the material of the ear-surface stretches along the bridges, and thus along the curved line (maze), such formation of the perforations will result in an increased stretchability of this structure compared to a conventional structure of same material.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
Prior art Fig. 1
FIG. 1 schematically illustrates a traditional ear-cushion with circular perforations forming a perforated area.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates a traditional ear-cushion with circular perforations P forming a perforated area. In this prior art implementation, it is possible to draw a straight line L between adjacent concentric circles. Such implementation suffers from discomfort which builds-up during wear of a headset with such ear-cushion.

Figure 2:
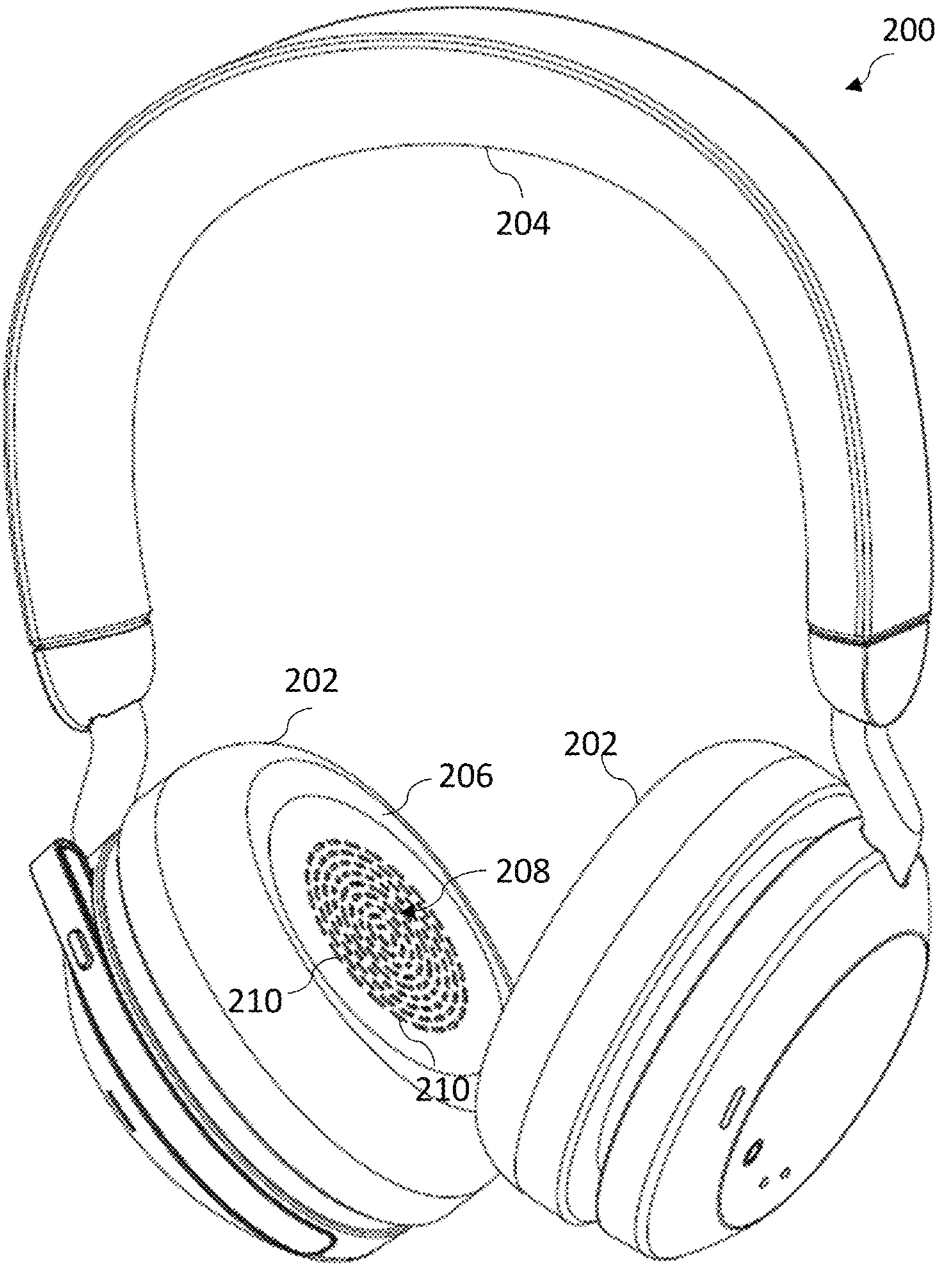
FIG. 2 schematically illustrates an on-ear headphones according to one embodiment of the invention.

FIG. 2 illustrates an on-ear headphones 200 according to one embodiment of the invention. The on-ear headphones 200 comprise two ear-cushions 202 interconnected with a band 204. The headphones 200 may comprise only one ear-cushion 202 and the other one may be replaced with a support bar for holding the headphones in place. The ear-cushions 202 define an ear-surface 206 configured to interface with a user's ear when the headphones 200 are worn by the user. The ear-surface 206 comprises a perforated area 208. The perforated area 208 comprises a plurality of staggered elongated perforations 210.

Figure 3:
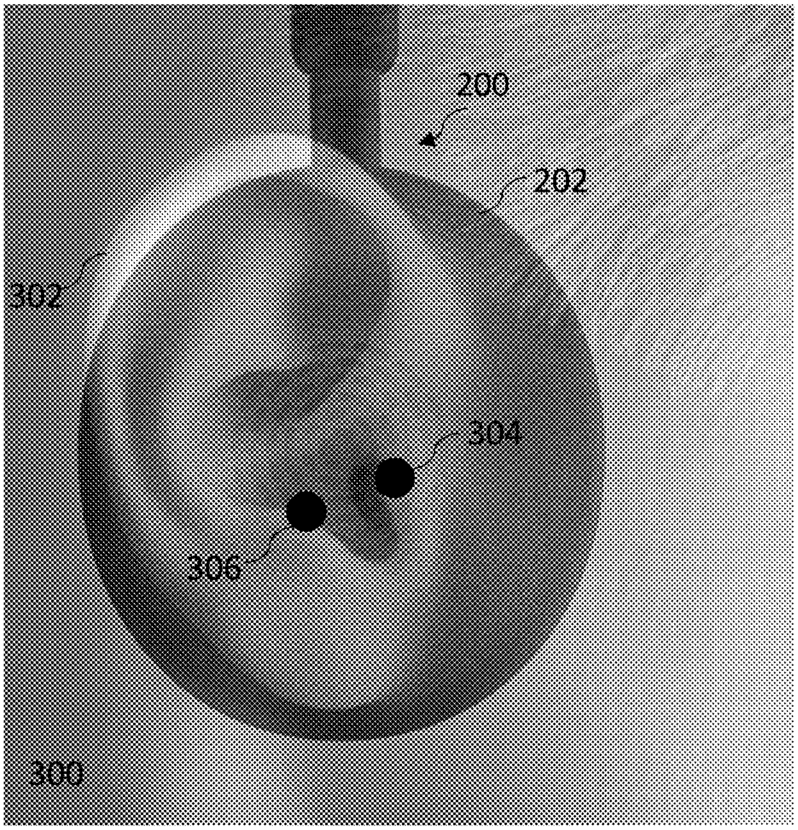
FIG. 3 schematically illustrates an on-ear headphones worn by a user.

FIG. 3 schematically illustrates an on-ear headphones 200 worn by a user 300. The ear-cushion 202 is arranged on the user's ear 302 and abuts the ear 302. After a long wear, the two contacting points, tragus 304 and antitragus 306, are mainly exposed to pressure from the ear-cushion 202. Having the headphones 200 with elongated staggered perforations the contact points 304 and 306 are exposed to decreased pressure. Thus, the user 300 is provided with an improved headphones compared to prior art headphones.

Figure 4:
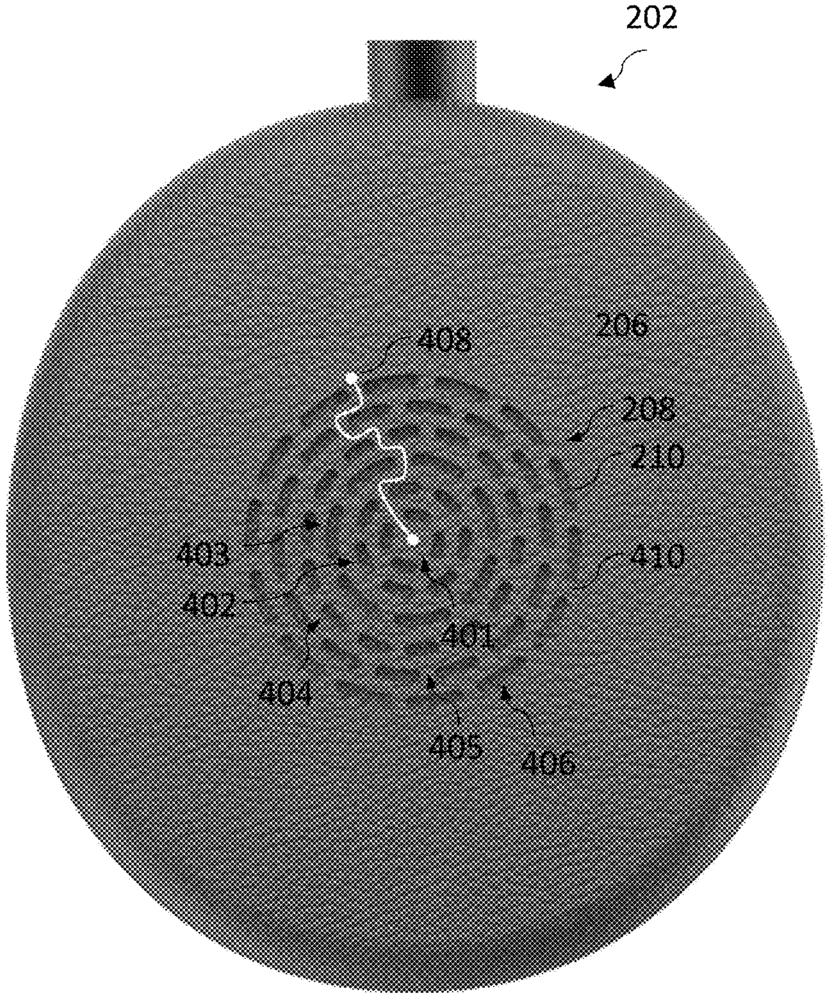
FIG. 4 illustrates an ear-cushion with perforations arranged in concentric circles.

FIG. 4 illustrates an ear-cushion 202 with perforations 210. The perforated area 208 comprises six concentric circle patterns 401-406. The ear-surface 206 is substantially flat. It can be seen that the elongated perforations 210 in different patterns have different size. Namely, the length of the perforations vary. At least two perforations 210 from two neighbouring circle patterns are arranged in staggered formation. The staggered formation results in a maze 408 formed by bridges 410. A space between two perforations 210 in the same circle is referred as a bridge 410. A bridge 410 in one circle, e.g. 406, is typically formed beside a perforation of an adjacent circle, 405. In this manner, the perforations 210 of adjacent circles are in the staggered formation. When the bridges 410 are overlapped with perforations on both sides, the maze 408 is formed starting from the center of the perforated area 208 and towards the outer borders of this area. The formed maze 408 is a line along which the material of the ear-surface can stretch. Since the maze 408 is longer than a straight line, such material is more stretchable than a material with non-staggered round holes. Namely, it is not possible to draw a straight line along the bridges 410, i.e. between the perforations 210, from the center of the perforated area 208 to the outer borders, without crossing at least one perforation 210. This means that it is possible to achieve a longer distance from the outside of the perforated area 208 to its center, or to a point of contact with the ear geometry (e.g. tragus and/or antitragus). Achieving longer distances means that the material is more flexible and therefore the contact points with the ear are exposed to less pressure. Such perforation formations improves flexibility, stretchability, and softness of the ear-surface and thereby provides improved comfort to the headset user. Instead of the concentric circles, the perforations may be arranged in any other concentric patterns, e.g., concentric polygons (squares, pentagon, hexagons, etc.), concentric ellipses, concentric stars, etc. The same principles, formations, and advantages equally apply for such patterns. In some embodiments, the perforated area 208 may have a diameter in the range between 15 and 40 mm, the ear-cushion surface may be in the range between 50 and 75 mm wide and about 55 to 90 mm long. The perforations may occupy around 100 to 250 $mm^2$ and the ear-surface may be around 2000 to 5000 $mm^2$. The perforations 210 may be at least 1 mm long and a width-to-length ratio of the perforations may at least be 1:2.

Figure 5:
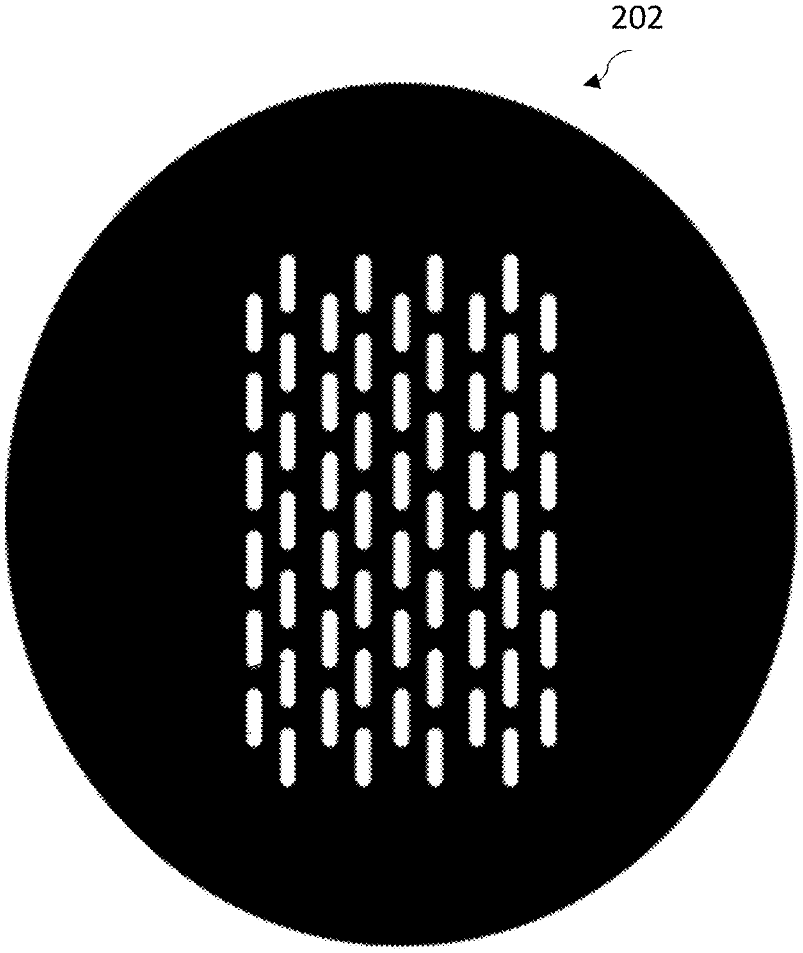
FIG. 5 illustrates an ear-cushion with perforations arranged in parallel straight lines.

FIG. 5 illustrates an ear-cushion 202 with a perforated area 208 wherein the perforations 210 are arranged in parallel straight lines 500. At least two perforations from two neighbouring lines are in a staggered formation. Namely, the leading edge of one perforation 511 in a second line pattern 502 is advanced over the neighbouring perforation 510 in the adjacent line pattern 501. Thus, when bridges are closed with perforations on both sides, a labyrinth 508 is formed starting from one side of the perforated area 208 and towards the opposite side of this area. Namely, it is not possible to draw a straight line along the bridges, i.e. between the perforations, starting from the left side of the perforated area 208 and to the opposite, right, side of this area, without crossing at least one perforation 210. Such perforation formations improves flexibility, stretchability, and softness of the ear-surface and thereby provides improved comfort to the headset user. In particular, the softness and flexibility of the perforated area is improved, and thereby comfort for the user.

Figure 6:
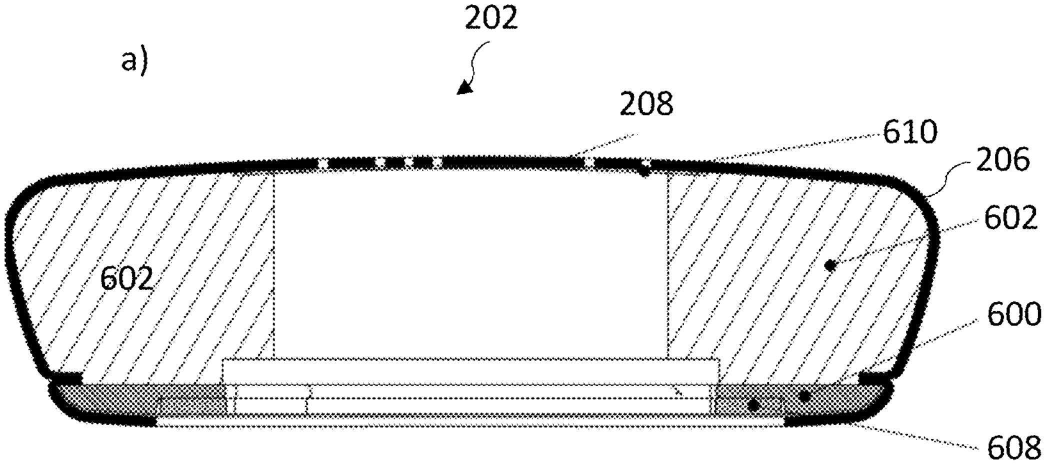
FIG. 6 schematically illustrates a cross-section of two different ear-cushion embodiments.
Figure 6:
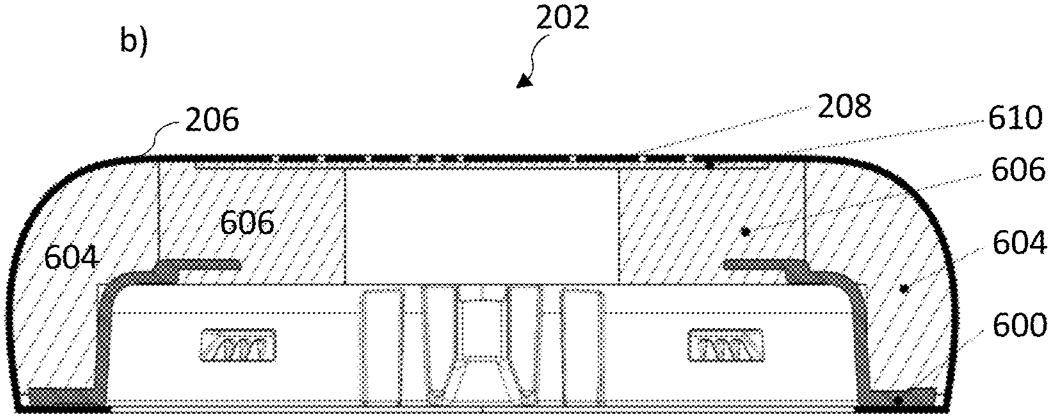

FIG. 6 schematically illustrates a cross-section of two different ear-cushion embodiments. The ear-cushion 202 shown in FIG. 6*a*) may comprise a cushion frame 600 and a sealing gasket 608. The ear cushion 202 may also comprise a foam layer 602 of a donut shape so that the area below the housing is hollow to allow sounds from the speaker to reach the user's ear. The ear-surface 206 may be made of a leatherette material. The perforated area 208 is formed below a hole formed in the donut-shaped foam 602 so that sound can reach user's ear. A fabric mesh 610 may be arranged below the perforated area 208. The embodiment shown in FIG. 6*b*) differs from the one shown in FIG. 6*a*) in the way foam is used. namely, in FIG. 6*a*) the foam layer 602 is uniform while the embodiment shown in FIG. 6*b*) uses two different foams, outer foam 604 and inner foam 606. The outer foam 604 and inner foam 606 typically have different density. The present invention can utilize both types of foam arrangement.

Figure 7:
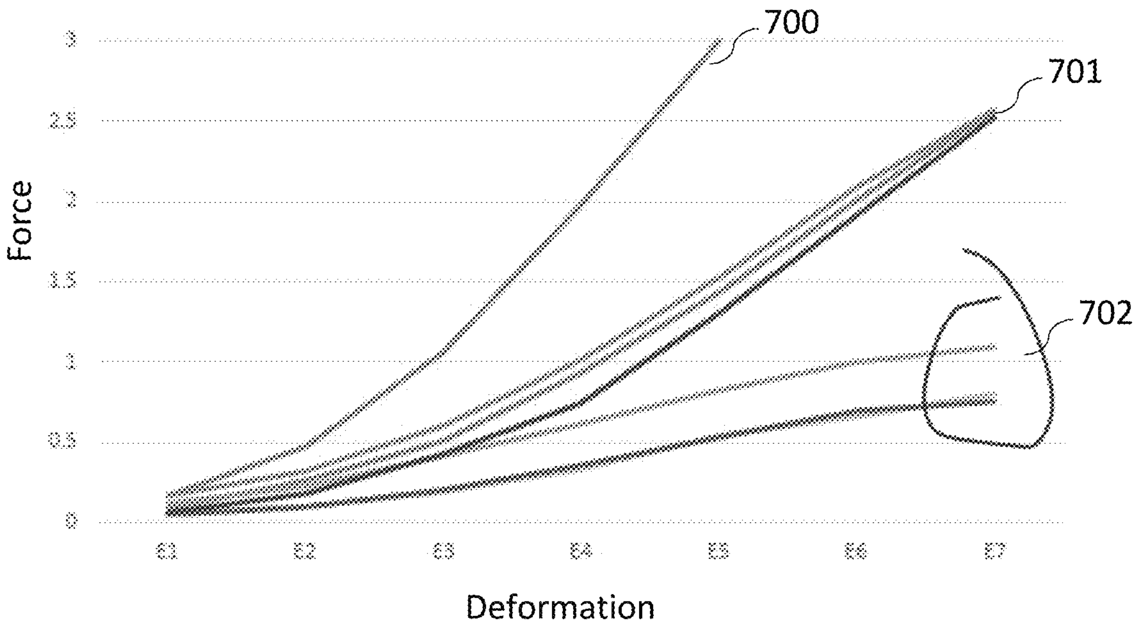
FIG. 7 is a graph showing elastic data for various types of ear-cushions.

FIG. 7 is a graph showing elastic data for various types of ear-cushions. The graph shows how a force (horizontal axis) to which the contact points of the user's ear is exposed on depends on a degree of deformation of the ear-surface (vertical axis). The top curve 700 represents a traditional ear-cushion with circular perforations. It can be seen that even for small deformations E5 the force exerted onto the ear is high. The group of three curves 701 also show prior art ear-cushions with a slightly improved comfort. And finally, the last group of three curves 702 shows three different embodiments of the present application. It can be seen that even for large degrees of deformation the user's ear is exposed to a low force and therefore low pressure. Lower pressure implies good comfort for the user even after a prolonged use.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents, as well as combination of various embodiments illustrated in the figures.

LIST OF REFERENCES

200 on-ear headphone
202 ear-cushion
204 band
206 ear-surface
208 perforated area
210 perforation
300 user
302 user's ear
304 tragus
306 antitragus
401-406 circle patterns
408 maze
410 bridge
500-502 line patterns
508 maze, labyrinth
510, 511 neighboring perforations
600 cushion frame
602 donut-shaped foam layer
604, 606 outer and inner foam layers of different density
608 a sealing gasket
610 fabric mesh
700, 701 prior art elastic curves
702 elastic cures of the present invention

The invention claimed is:

1. On-ear headphones comprising at least one ear-cushion, the at least one ear-cushion defining an ear-surface configured to interface with a user's ear when the headphones are worn by the user, the ear-surface comprising a perforated area, the perforated area comprising a plurality of staggered elongated perforations.

2. The on-ear headphones according to claim 1, wherein at least two elongated perforations have different size.

3. The on-ear headphones according to claim 1, wherein the plurality of perforations are arranged in concentric circles, wherein at least two perforations from two neighbouring circles are in a staggered formation.

4. The on-ear headphones according to claim 1, wherein the plurality of perforations are arranged in parallel straight lines, wherein at least two perforations from two neighbouring lines are in a staggered formation.

5. The on-ear headphones according to claim 1, wherein the perforated area occupies at least 3% and at most 50% of the entire ear-surface.

6. The on-ear headphones according to claim 1, wherein the ear-cushion comprises at least one layer being made of a foam material.

7. The on-ear headphones according to claim 1, wherein the ear-surface is made of a plastic material and/or leatherette material.

8. The on-ear headphones according to claim 1, wherein the perforations are at least 1 mm long.

9. The on-ear headphones according to claim 1, wherein a width-to-length ratio of the perforations is at least 1:2.

10. The on-ear headphones according to claim 1, wherein the ear-surface is substantially flat.

11. The on-ear headphones according to claim 1, wherein the plurality of perforations are arranged such to form a maze when starting from the center of the perforated area and towards an outer border of the perforated area.

* * * * *